United States Patent [19]

Pingree

[11] 4,256,445

[45] Mar. 17, 1981

[54] TROWEL MEANS FOR LINING AND SMOOTHING THE INTERIOR OF PIPES WITH A PROTECTIVE COATING

[76] Inventor: Robert J. Pingree, 270 NE. 21st St., Boca Raton, Fla. 33432

[21] Appl. No.: 950,661

[22] Filed: Oct. 12, 1978

[51] Int. Cl.³ .............................................. B28B 21/18
[52] U.S. Cl. ..................................... 425/101; 425/95; 425/262; 425/460; 425/469
[58] Field of Search ................. 425/101, 262, 95, 460, 425/469

[56] References Cited

U.S. PATENT DOCUMENTS

| | | | |
|---|---|---|---|
| 2,261,928 | 11/1941 | Perkins et al. | 91/45 |
| 2,924,867 | 2/1960 | Perkins | 25/38 |
| 2,987,794 | 6/1961 | Perkins | 25/38 |
| 3,044,136 | 7/1962 | Perkins | 25/38 |
| 3,105,282 | 10/1963 | Perkins | 25/38 |
| 3,263,296 | 8/1966 | Barton | 25/38 |
| 3,334,389 | 8/1967 | Mathery | 425/262 |
| 3,619,876 | 11/1971 | Perkins | 425/262 |
| 3,966,389 | 6/1976 | Shubert | 425/262 |

Primary Examiner—Lester L. Lee
Attorney, Agent, or Firm—James Creighton Wray

[57] ABSTRACT

A frusto-conical trowel apparatus for smoothing mortar or plastic lining material in a pipe or conduit or other such object which has a generally cylindrical inner surface. The trowel body consists of a plurality of laterally overlapping plate members which are mounted onto an inner frame at the small end of the trowel body; such inner frame and it's support bars being enclosed in a conical device to prevent mortar from entering the trowel body; having small rods connecting a spring member to the inner frame while allowing the spring member to reside at the large end of the trowel body and provide pressure against the trowel plate members in order to establish compressibility diametrically of same, creating needed radial troweling pressure.

14 Claims, 5 Drawing Figures

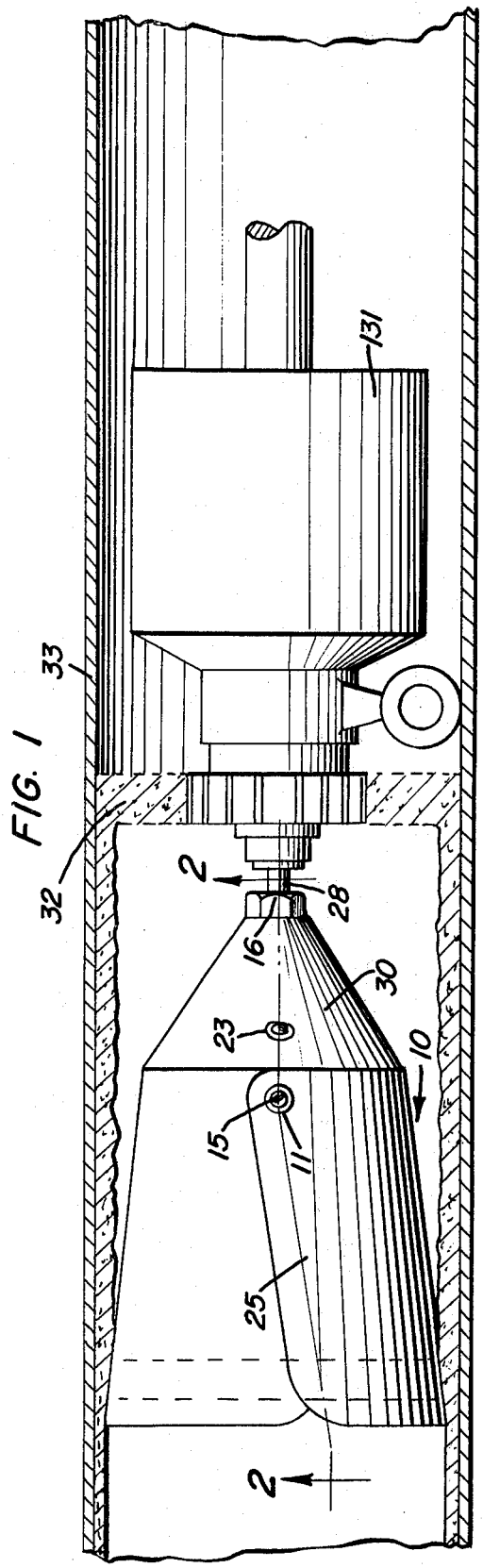
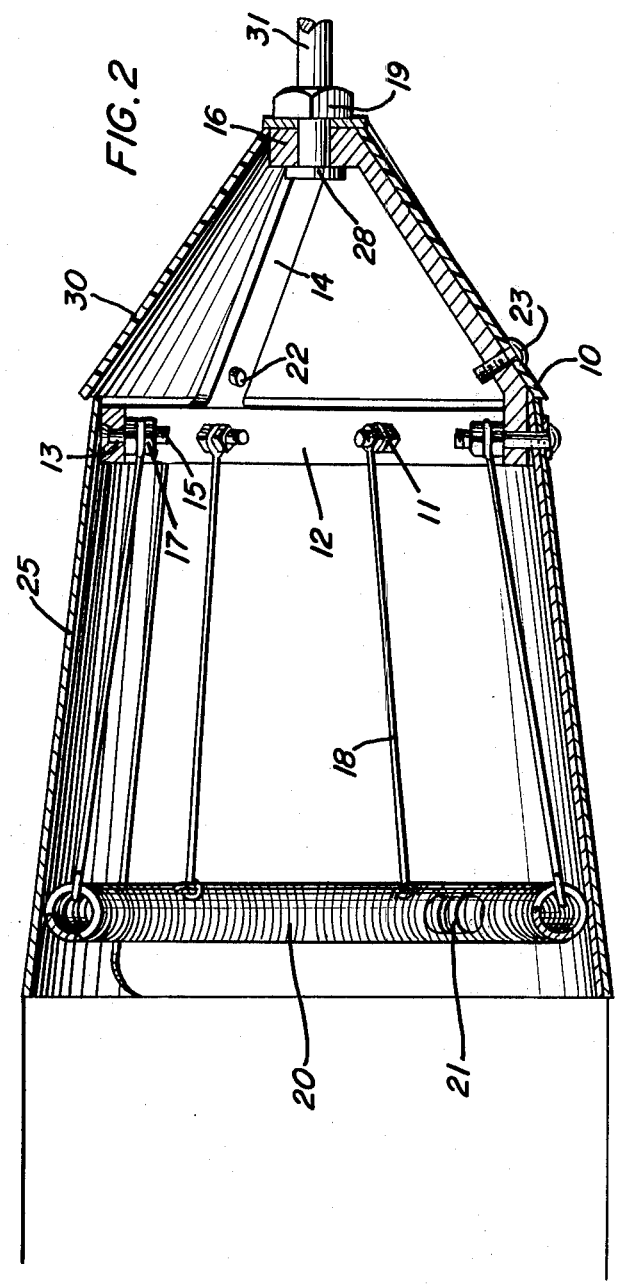

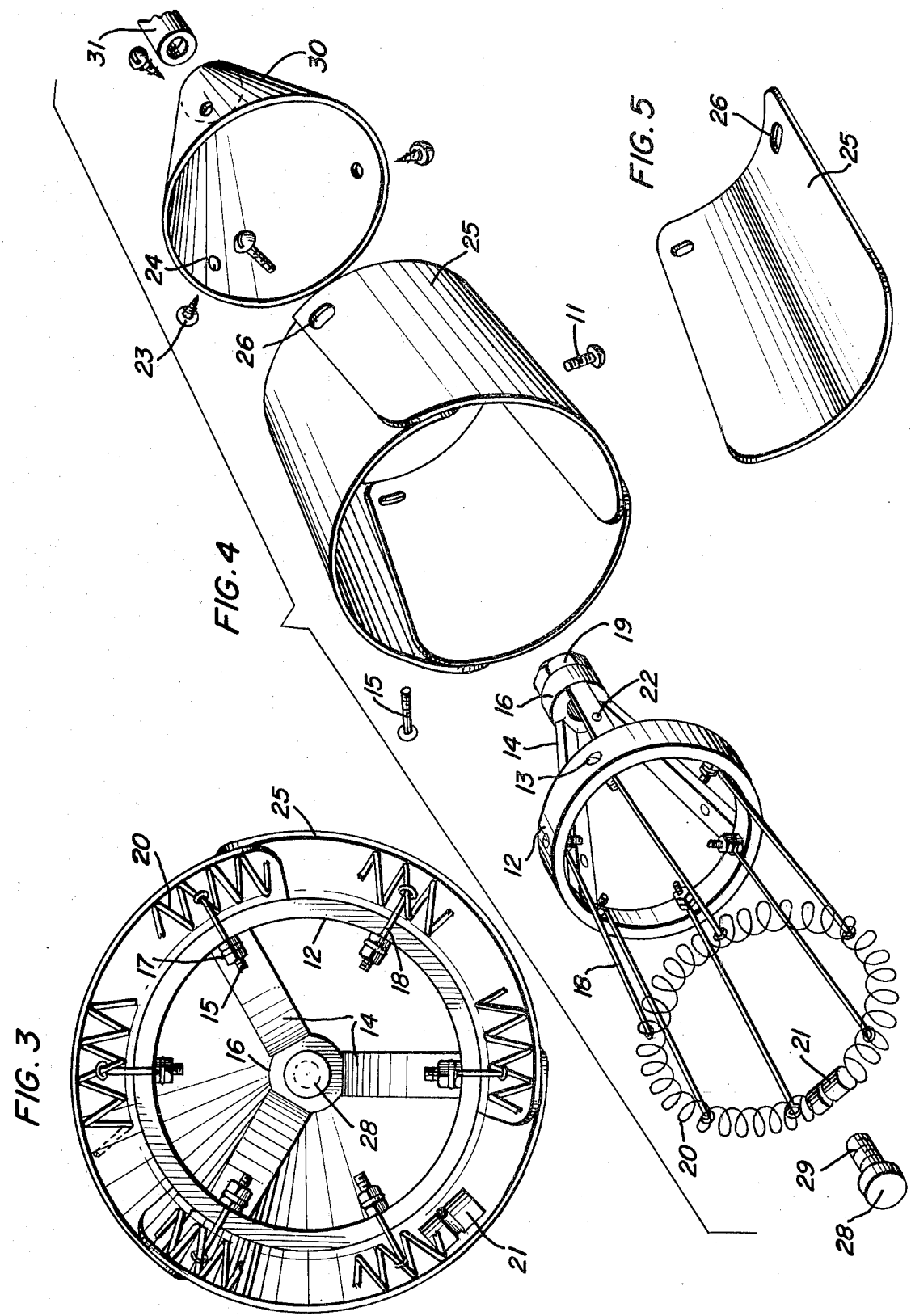

TROWEL MEANS FOR LINING AND SMOOTHING THE INTERIOR OF PIPES WITH A PROTECTIVE COATING

BACKGROUND OF THE INVENTION

1. Field of the Invention

This invention relates generally to devices for smoothing a coating of mortar or similar material such as plastic lining to the interior walls of pipes, conduits and the like to insure a smooth uniform coating at all peripheral interior wall portions of the pipes or conduits.

2. Description of the Prior Art

Devices for applying a lining of mortar or like plastic material to the interiors of pipes and the like are well known and generally comprise a machine which travels on rollers through the pipes to be lined, distributing a coating of the lining material.

Attached to this machine and directly following it, by being pulled by same, is what is known in the art as a "drag" trowel, which is the subject of this invention. Most such "drag" trowels consist of a frusto-conical type body which is adapted to be drawn through a pipe by the coating applying machine, thus troweling the newly applied coating into a smooth internal surface. The large ends of such trowels generally have some means to establish that it is resiliently expandable and contractible in diameter and which end trails the smaller diameter end or mounting end when drawn by the coating machine through the pipe.

A primary problem of the prior art is the opportunity for mortar or other material used to line pipes with to fall into the troweling device and clog same. Although many devices of this type have springs and other means to keep the plate members from coming apart at the large end so that mortar will not enter and clog the same, mortar could be thrown off the coating machine and enter into the small end of many other of these types of devices. None of the prior art includes a completely closed body as does the one in this invention.

Where the prior art examples have frames and/or pivot points on which the trowel plate members are mounted, many of these pivots and frames are exposed and easily subject to clogging or breaking from falling mortar or small stones which may have been mixed into the mortar. This, in turn, could render the trowel unuseable while in use.

Another problem with the prior art is the use of small springs, a plurality of which may be attached directly to the plate members. These spring members keep the plate members together and aid in the compressibility of the trowel but there is a possibility of the trowel being dented along the edges and in the places where there is no spring member. These small dents could affect the action of the trowel.

Another problem could be encountered by the use of these many spring members on the trowel. As the trowel is used, some of these spring members will invariably stretch more than the others and after being used, some of the plate members will have less troweling pressure as a result of these weaker springs. This, in turn affects the radial troweling effect of the troweling device.

A further problem is that in many of the prior art patents the trowels are attached to the mortar applying machine or drawn through the pipes by a plurality of attaching rods. Should one of these rods break or even get bent, it would throw the trowel on an uneven slant and ruin the troweling effect in the pipe.

Known prior art U.S. Pat. Nos. relating to this invention are as follows:

A. G. Perkins—3,619,873—July 31, 1969
W. E. Perkins—3,188,710—Feb. 3, 1964
J. T. Barton—3,368,253—Nov. 22, 1965
J. T. Barton—3,384,940—May 28, 1968

In all of these prior art patents all of the devices have an open small leading end and are subject to possible clogging from the mortar or other lining material falling into the device.

They also all include a plurality of small springs which are mounted onto the plate members between their respective overlaps and which are subject to wearing out or breaking and causing uneven pressure of the plate members against the pipe. The plate members are also subject to dents in the places between where the springs are located if the springs can't absorb shocks quickly.

A plurality of attaching rods are seen in U.S. Pat. Nos. 3,619,873 and 3,188,710. As stated before should one of these rods get bent or be broken the troweling effect of the trowel could be uneven.

In U.S. Pat. Nos. 3,619,873; 3,188,710 and 3,384,940 the mounting points for the plate members are exposed and thus more subject to possible breakage or clogging which would affect the proper working ability of the trowel.

None of these prior art devices offers the new and unique features of the invention disclosed herein.

SUMMARY OF THE INVENTION

A primary object of the present invention is to provide a troweling device that exerts a substantially even troweling pressure from all of the plate members, while also allowing for compressibility of these same members in the event of irregularities in the pipe and to allow for the sections of the pipe where there are turns and curved joints.

These is achieved by the use of a single spring member with its ends attached to each other by a spool or other means and laid substantially at the large end of the plate members in a circumferential position. The spring member is then kept in place by the use of small rods attached to the spring member via its small circular ends, and also attached in a pivotable manner via screws or bolts and nuts, to the inner frame of the trowel.

Another object is for the trowel body to pass over irregularities or bumps in the pipe without denting the plate members. By the spring member laying as it does against the plate members no parts of the plate members have to stand up to shock by itself. The spring member will compress and absorb the shock while allowing the plate member to ride with it.

By having the leading end of the trowel enclosed in a conical device another object is realized. Mortar falling from above the troweling device or thrown off from the mortar applying machine can't enter into the closed body of the trowel of this invention and clog the same. It would instead fall to the bottom of the pipe and be troweled over.

A further object is also realized by this closed body feature. The mounting frame is enclosed inside this conical device and, therefore, the frame is not exposed and subject to clogging and possible malfunction from falling mortar.

The materials used for the plate members could be sheet aluminum, sheet steel, plastic or other similar materials depending on use, condition of the pipe, and thickness of the mortar or other lining to be used in the pipe. The plate members as well as the complete trowel may be made in as many different sizes as their are many different size pipes.

A variety of materials may also be used for the inner frame. The large and small rims and the three support arms may be cast aluminum, forged aluminum, or forged steel or other material that is reasonably strong, fairly light and can be molded or welded into substantially one inner frame member.

A coil spring member is used instead of another type, like a straight spring, because it has been found to stand up to greater shock and compress quicker under the conditions it would be subject to during use of the device.

It has also been found advantageous to use a wooden connecting spool to hold the two ends of the coil spring together. The wood is easy to slip the ends of the spring member onto and yet holds them securely. Furthermore, when exposed to the damp interior of pipes, while the trowel is in use, the wood will swell and secure the ends even tighter.

The plate members are curved along the longitudinal axis of the trowel and contain holes or slots for mounting in the top corners of the small end of each plate member. If slots are used they allow some flexibility in retaining the plate members where use of holes would allow secure retaining of the plate members. One plate member overlaps another so that the holes correspond and then screws or bolts are inserted and secured with nuts so as to securely mount the plate members.

Rust resistant or stainless steel nuts, bolts or screws could be used for attaching the members of the device so they would not be as subject to rust from any dampness in the pies.

These screws or bolts and nuts used to mount the plate members also penetrate the inner frame and are used to mount roughly one-half of the small attaching rods used on the inside of the trowel to hold the spring member in position. Holes to attach the other half of the small attaching rods are drilled proportionally between the holes to mount the plate members, in the inner frame underneath the plate members.

By the double use of one-half of these holes in the inner frame, the number of holes are reduced as are the number of screws, nuts or bolts used to mount the plate members and the small attaching rods.

These rods may be either wire or steel. Steel for large models or heavy troweling jobs with thick layers of mortar, and wire for small models and light troweling jobs or thin layers.

A final object is to provide for a sturdy, secure method of evenly drawing the trowel through the pipe. This is done by having one central mounting point which is used to mount the device directly onto the mortar applying machine by a lug bolt or similar means to hold the trowel virtually solid and secure.

These together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a longitudinal cross section of a pipe in which a side view of the trowel of the present invention is working against a roughly applied internal mortar coating to smooth the same.

FIG. 2 is a side view in section showing the inside of the trowel body and the features of the same.

FIG. 3 is an end elevational view of the trowel assembly of FIG. 1, viewed from the larger following or open end of the trowel.

FIG. 4 is a top perspective partially exploded view of the troweling device in order to show the assembly method and means.

FIG. 5 is a perspective view of one of the plate members showing the shape of same.

DESCRIPTION OF THE PREFERRED EMBODIMENT

Referring to FIG. 1 of the drawings, reference numeral 10 relates generally to the embodiment of the frusto-conical troweling device of this invention which is connected to a pipe lining machine 131 by a lug bolt 28 via threads 29 entering a receptacle 31 which is threaded and part of the mortar applying machine 131.

The pipe lining machine 131 distributes the mortar or other material 32 needed to coat the inside of a pipe or conduit 33. This coating 32 is then smoothed or troweled over by the troweling device 10 of this invention.

The lug bolt 28 passes through the small rim 16 and attached hexagon shaped nut 19 to which is connected the conical device 30 under which lies the support bars 14 as seen in FIG. 2. This conical device 30 is attached to the support bars 14 by appropriate means such as screws 23 which penetrate both.

The plate members 25 are then attached onto the inner frame 12 as seen in FIG. 2 via appropriate means such as screws 15 and spacers 11 so that they fit against the conical device 30.

FIG. 2 is also an illustration of the interior of the trowel device 10. A spring member 20 has its ends connected via a connecting spool 21 and is laid in a circumferential manner against the larger ends of the plate members 25. Small rods 18 are connected to the spring member 20, in order to retain it in position, and also to the inner frame 12 in a pivotable manner by means such as screws or bolts 15 and nuts 17 which pass through holes 13 in the inner frame 12. There are also holes 22 in the support bars 14 for attaching the conical device 30 via screws 23 to the support bars 14.

FIG. 3 is an inside view looking into the troweling device 10 from the large troweling end. Again the spring member 20 is attached to the small rods 18 which are attached to the inner frame 12, via screws 15 and nuts 17. The inner frame 12 leads to support bars 14 and small rim 16 and hexagon shaped nut 19 through which the lug bolt 28 is passed in order to connect the troweling device 10 to the mortar applying machine.

As can be seen, FIG. 5 shows a single plate member 25 with its mounting holes or slots 26 used to mount the plate members 25 onto the inner frame 12 through holes 13 as in FIG. 4.

Roughly one-half of the screws 15 used to hold the small rods 18 also are used to mount the plate members 25 to the inner frame 12. This reduces the amount of screws 15 and holes 13 needed. FIG. 4 shows the inner frame 12, support bars 14, small rim 16, connecting rods 18 and spring member 20 disassembled. The plate members 25 are laid together and the conical device 30 is ready to assemble. The holes 24 can easily be seen in the conical device 30 as can the holes 22 in the support bars 14 to which it will be attached.

The lug bolt 28 is passed through the center of the small rim 16 and hexagon shaped nut 19 to attach the device 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A trowel apparatus for smoothing a layer of mortar or plastic lining material in the interior of a generally cylindrical pipe or tubing comprising; means to form a resiliently expansible frusto-conical trowel body, having a relatively small leading end and a trailing end of larger size including a plurality of longitudinally extending overlapping plate members, each plate member being curved about the longitudinal axis of the apparatus and having one end of each plate member mounted to means for retaining a relatively fixed diameter of said plate members at the said small leading end of the troweling apparatus, wherein said means for mounting the said plate members to retain a relatively fixed diameter include an inner frame which is generally conical and coaxial with said frusto-conical body and includes a main rim and at least three support arms which taper down to a small rim and a hexagon shaped nut, which are welded together to form a substantially single inner frame member.

2. The apparatus as set forth in claim 1, wherein said means to form said resiliently expansible frusto-conical trowel body includes a single resilient means for allowing said plate members to be compressible diametrically at the larger trailing end of said trowel body while exerting the necessary radial troweling pressure.

3. The apparatus as set forth in claim 1, wherein the apparatus contains means for attaching said frusto-conical trowel body to a mortar applying machine in a relatively secure manner, to allow for evenly distributing the necessary radial troweling pressure, with a minimum of action, tools and time.

4. The apparatus as set forth in claim 1, wherein at least three plate members are used to form the frusto-conical trowel body, all of which overlap each other at their respective edges and share screw and nut means at this overlap along their small leading end in order to mount said plate members onto means for retaining their diameter in a relatively fixed position.

5. The apparatus as set forth in claim 2, wherein the single resilient means for allowing said plate members to be compressible diametrically includes a coil spring member with additional means to hold its respective ends attached in order to form a circular shape, said coil spring member laying in a circumferential manner against the large trailing end in the interior of the apparatus.

6. The apparatus as set forth in claim 3, wherein means for attaching said frusto-conical trowel body include hexagon shaped nut means welded onto the said small rim of said inner frame through which lug bolt means with threads is inserted into a receptacle for same and tightly secured, attaching the apparatus to the mortar applying machine.

7. The apparatus as set forth in claim 1 wherein said inner frame with all it's respective parts is enclosed in a plastic conical device by means to attach same to said inner frame to provide protection for the apparatus from becoming clogged and damaged by failing mortar entering the apparatus.

8. The apparatus as set forth in claim 7, wherein means to attach said conical device include screw means which penetrate said conical device and enter receptacles in the respective support arms of the said inner frame.

9. The apparatus as set forth in claim 5, wherein said additional means to attach the ends of said coil spring member includes wooden connecting spool means which holds the ends of the coil spring member securely.

10. The apparatus as set forth in claim 9, wherein said coil spring member is also attached to at least six small attaching rod means via small circular ends of same, at evenly distributed points on the said coil spring member, for retaining same in it's relative position in the frusto-conical trowel body.

11. The apparatus as set forth in claim 10, wherein said small attaching rods are further attached to the main rim of the inner frame by means to secure said small attaching rod means in such manner as to allow stability of same at the same time as allowing for flexibility of the frusto-conical trowel body.

12. The apparatus as set forth in claim 11, wherein means to attach said small attaching rod means to the main rim of said inner frame include the use of at least six screw means which penetrate said inner frame, and at least twelve nut means used to hold the small attaching rod means in place and yet provide additional space between the said small attaching rod means and the said curved plate members.

13. The apparatus as set forth in claim 12, wherein the relative position of the coil spring member together with the means of attaching said coil spring member combine to provide the compressibility and pressure needed against the plate members to allow said plate members to exert the necessary radial troweling pressure.

14. The apparatus as set forth in claim 12, wherein of the said means used to attached the small attaching rods, about one-half of the screw means are also used to mount the plate members on the inner frame, thus reducing the number of holes, screws and nuts needed to complete the frusto-conical trowel apparatus.

* * * * *